United States Patent Office 2,743,091
Patented Apr. 24, 1956

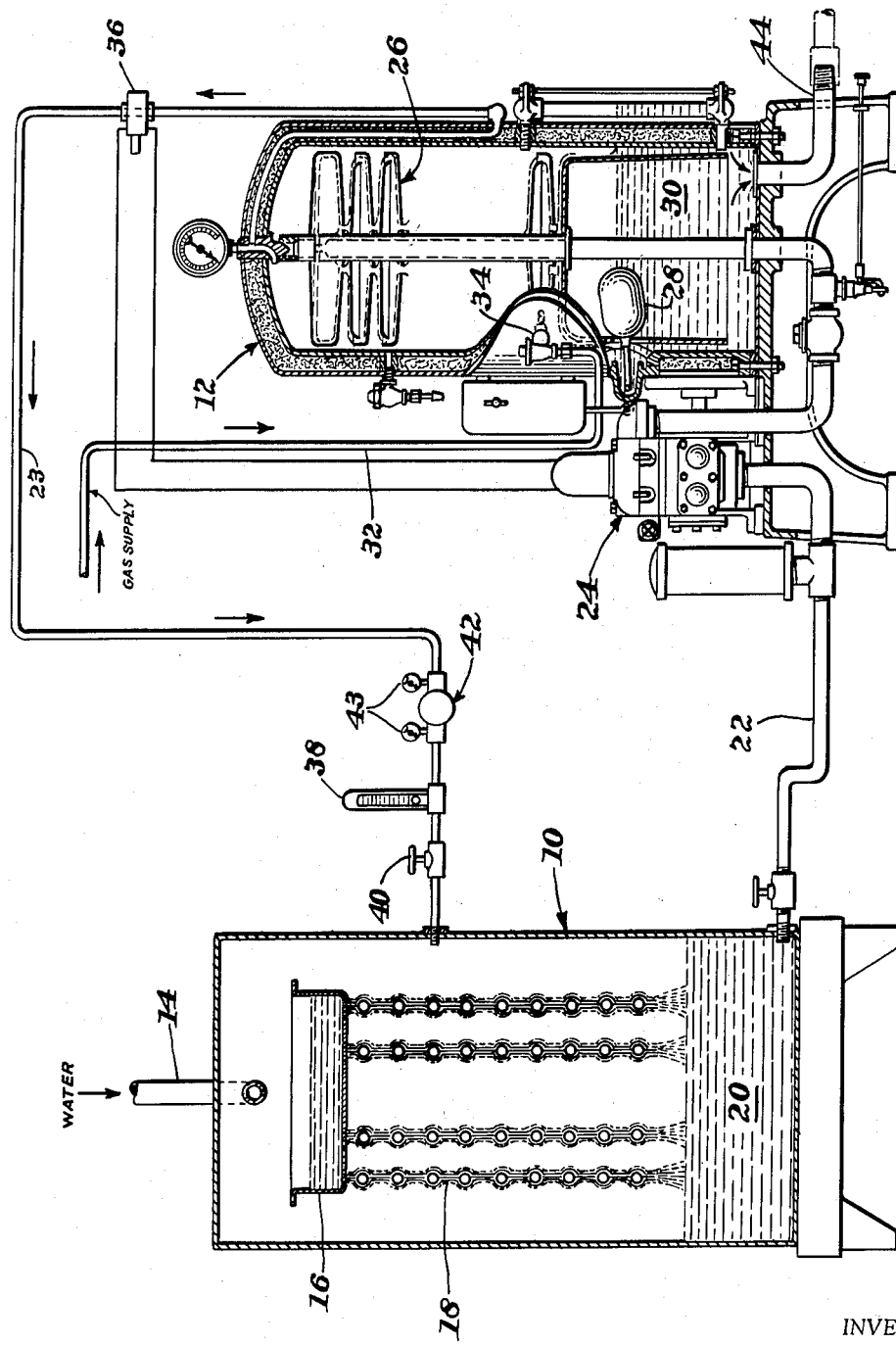

2,743,091

WATER DEAERATING AND CARBONATING SYSTEM

Carl L. Day and Wilmer D. Regnier, Baltimore, Md., assignors to Crown Cork & Seal Company, Inc., Baltimore, Md., a corporation of New York Application March 25, 1953, Serial No. 344,614

1 Claim. (Cl. 261—11)

The present invention relates to a water deaerating and carbonating system, and more particularly, a system wherein the water is first precarbonated and partially deaerated and then completely carbonated.

An object of the present invention is the provision of a system which will supply water that has been completely carbonated to a filling machine or the like. In carbonating water for use in the making of a carbonated beverage, it is very undesirable and often detrimental to have the presence of dissolved air in the carbonated water. The oxygen component of the air will cause loss of flavor and aroma in many beverages while in many other beverages it will oxidize with the natural oils thereby promoting bitterness and rancidity. Therefore, it is an important feature of the present invention to remove the dissolved air from the water during the carbonation process.

Another object of the present invention is the provision of a water deaerating and carbonating system wherein carbonated water is produced in a substantially stable state. When $CO_2$ gas is dissolved in water, it enters into a loose chemical combination of carbonic acid, and such a combination is not stable if there are any loosely held gases, such as air, dissolved in the water. The loosely held air would, if released from the water, form a nucleus for gathering carbon dioxide bubbles and thus undesirable foaming would occur. Excessive foaming is undesirable during the filling operation or when a filled container is opened because it shortens the life of the beverage. By providing carbonated water, which has been deaerated, the evolution of carbon dioxide gas from the water will be slow and steady and the undesirable condition of foaming during the filling operation or when a filled container is opened is materially reduced.

A further object of the present invention is the provision of a water deaerating and carbonating system wherein the water flows from a cooling tank to a carbonator or saturator and at the same instant the $CO_2$ gas and air in the gas space of the carbonator flows therefrom to the cooling tank. Thus, water entering the cooling tank will be precarbonated and partially deaerated because the $CO_2$ gas has a great affinity for cool water and will drive out the air dissolved in the water.

A still further object of the present invention is the provision of a water deaerating and carbonating system wherein the $CO_2$ gas and air flowing from the carbonator to the water cooling tank will only flow at such times when the water in the cooling tank is actually flowing to the carbonator. Since the $CO_2$ gas is metered to the cooling tank from the carbonator at a volume required in proportion to the amount of water being actually used, the amount of $CO_2$ gas consumption in the system can be controlled resulting in a substantial economy in operating costs.

Still another object of the present invention is the provision of a water deaerating and carbonating system wherein the $CO_2$ gas in the carbonator is maintained at or near 100% $CO_2$. By maintaining the gas in the gas space of the carbonator at or near 100% $CO_2$ a substantial reduction of operating pressures in the carbonator may be maintained, thus further economizing on the use of $CO_2$ gas in the system without decreasing the efficiency of the system or the quality or quantity of carbonated water supplied therefrom.

These and other objects of the invention will be apparent from the following specification, claim and accompanying drawing.

The drawing discloses a diagrammatic illustration of a preferred embodiment of the carbonating system, showing a novel arrangement of elements for obtaining the desired results.

The deaerating and carbonating system is generally comprised of a cooling tank 10 connected to a carbonator 12. Suitable water and gas connections between cooling tank 10 and carbonator 12 are provided and will be explained in more detail later in the specification. Briefly, raw water is supplied to cooling tank 10 and, at this station in the system, the raw water is cooled so that it may have an affinity for absorbing $CO_2$ gas flowing from carbonator 12. Since water has a greater affinity for $CO_2$ gas when it is cooled, it will readily absorb the $CO_2$ gas when brought in contact therewith, and the $CO_2$ gas will partially drive out the air entrained or dissolved in the water. At the same time the $CO_2$ gas is releasing some of the air from the water, a portion of the $CO_2$ gas will be absorbed by the water and the resulting product will be a precarbonated and partially deaerated water. The precarbonated and partially deaerated water is supplied from cooling tank 10 to carbonator 12 where the water is again treated with a commercially pure $CO_2$ gas. Commercially pure carbon dioxide contains substantially 100% $CO_2$ gas. When the $CO_2$ gas is brought into contact with the precarbonated and partially deaerated water in the carbonator, the remaining entrained or dissolved air will be released from the water so that the final resulting product is a highly carbonated water which is in a stable condition since the air has been removed. It is this released air which mixes with the $CO_2$ gas in the carbonator that is supplied to the cooling tank 10 for the preliminary step of precarbonation and deaeration.

Referring specifically to the drawing, cooling tank 10 is preferably of the type having a plurality of spaced, vertically positioned cooling plates 18 mounted under a tray 16. Plates 18 may be cooled by any suitable refrigerant flowing therethrough. Tray 16 is provided with a plurality of rows of holes adjacent each of the cooling plates so that water may be discharged therefrom and flow over the cooling plates in a thin film. Raw water is supplied to tray 16 by means of an inlet pipe 14. The lower portion of cooling tank 10 is provided with a reservoir 20 which stores the partially deaerated and precarbonated water. Although the cooler shown in the preferred embodiment discloses a refrigerating surface comprising a plurality of vertical plates 18, it is well within the scope of the invention that any similar type of cooler may be used where the water being cooled is flowed in a thin film over the cooling plates.

Since $CO_2$ gas is to be flowed into cooling tank 10, it is necessary that the casing of the cooling tank be substantially airtight. A positive pressure up to 2 p. s. i. $CO_2$ gas and air must be delivered to the cooling tank in order that the required precarbonation and partial deaeration can be obtained. Any suitable means such as a float control vent valve in cooling tank 10, a constantly opened aperture of fixed diameter in tank 10, a pressure responsive valve in tank 10 or the like, may be used to maintain the pressure of gas in tank 10 at substantially 2 lbs. per square inch.

The raw water supplied to cooling tank 10 is controlled by means of a float actuated valve (not shown) or in any well known manner. When the water level in reservoir 20 drops below a predetermined limit, the raw water inlet valve will open and permit raw water to flow into tray 16 and over the cooling plates 18. This condition ordinarily occurs when precarbonated and partially deaerated water is being pumped into carbonator 12 and at which time the mixture of $CO_2$ gas and air in the gas space of the carbonator is flowed into cooling tank 10. Thus, the inflowing raw water, which is flowing over plates 18 in a thin film, is initially brought into contact with $CO_2$ gas.

The cooling tank 10 is connected to the carbonator or saturator 12 by means of a water feed pipe 22 and a counter flow $CO_2$ gas and air pipe or line 23. Carbonator 12 is preferably the type having an upright cylindrical casing with a plurality of vertically mounted and horizontally extending film plates 26. A water inlet pipe is centrally mounted in the interior of the cylindrical casing and extends upward through the film plates 26 so that water may be flowed down and over each of the film plates in a thin film as it is treated with $CO_2$ gas for a second time. In order that the water may be pumped into carbonator 12, an electrical motor driven pump 24 is provided in the water inlet line 22. Water pump 24 is controlled through a suitable circuit and switches by a float 28 in a carbonator 12. Float 28 will operate to close a switch and energize the motor to start the pump 24 when the carbonated water in the reservoir 30 of carbonator 12 drops below a predetermined level. The level of carbonated water in reservoir 30 is dependent on the demand of a filling machine which draws the charged water from carbonator 12 through an outlet pipe 44.

Commercial $CO_2$ gas is supplied to carbonator 12 from a suitable source of supply by means of gas supply line 32 which enters the carbonator at 34. The $CO_2$ gas entering carbonator 12 will be absorbed by the precarbonated and partially deaerated water flowing over the film plates and as previously explained any air which is still entrained or dissolved in the water will be released. The released air will mix with the $CO_2$ gas in the space above reservoir 30, and the mixture is removed therefrom as will be subsequently explained.

A condition which is normally desired in carbonator 12, in order that maximum efficiency may be obtained, is to have the space above the level of water in the reservoir 30 at or near 100% $CO_2$ gas. Therefore, in the past, it has been necessary to bleed off the mixture of $CO_2$ gas and air in the top of the carbonator as the air content therein will build up in the course of a working day and reduce the efficiency of carbonation. To eliminate this undesirable feature, and to utilize the $CO_2$ gas mixed with air, a $CO_2$ gas and air return line 23 is connected to the cooling tank 10. Thus, $CO_2$ gas and air will bleed off of the gas space above the water in the carbonator and pure $CO_2$ gas will replace it.

In order that the maximum efficiency of the system may be obtained, a solenoid operated valve 36 is provided in $CO_2$ gas and air line 23. Solenoid operated valve 36 is connected to the motor operated pump in any suitable manner so that the valve will operate to open when the pump 24 is operating to pump water into the carbonator. By having the $CO_2$ gas and air bleed off of the carbonator only when the pump is operating and then reused in the initial treatment of the water, the consumption of $CO_2$ gas is controlled and there is no waste.

A flow meter 38 is provided in gas and air line 23 so that the volume of gas and air being delivered from carbonator 12 to cooling tank 10 can be adjusted to a given amount depending on the rate of flow of water from the cooling tank to the carbonator. Flow meter 38 is provided with a restrictor valve 40, which may be a needle type valve integral with or separate from the flow meter. Restrictor valve 40 of flow meter 38 is adjusted with respect to a given flow of water so as to control the volume of the flow of gas required to precarbonate the water in the cooling tank to about one volume.

The pressure of $CO_2$ gas in carbonator 12 can vary from 5 p. s. i. to 90 p. s. i. depending upon the product being carbonated. Since it is necessary that flow meter 38 be supplied with gas at a constant pressure so that the volume of gas passing into the cooling tank 10 is constant for a given flow of water from the cooling tank to the carbonator, a pressure regulator 42 is provided in the $CO_2$ gas and air line 23 between the flow meter 38 and carbonator 12. Pressure regulator 42, which has pressure gages 43 mounted thereon, insures constant pressure of the gas being delivered to the flow meter 38 regardless of slight variations of pressure within carbonator 12.

The operation of the system is as follows: Raw water is supplied to cooling tank 10 where it is precarbonated and partially deaerated by the flow of a mixture of $CO_2$ gas and air into the cooling tank from carbonator 12. When the carbonator supplies carbonated water to the filling machine, the level of liquid in the reservoir 30 of the carbonator drops and the float 28 closes a switch to operate the electric motor operated pump 24. Pump 24 pumps the precarbonated and partially deaerated water from the reservoir 20 of cooling tank 10 into carbonator 12 where the final stage of carbonation is obtained. At the same instant that the pump 24 starts pumping water into carbonator 12, the solenoid valve 36 in the gas and air line 23 is opened allowing a flow of $CO_2$ gas and air in a metered quantity into cooling tank 10.

By flowing the $CO_2$ gas and air from the gas space in carbonator 12, the $CO_2$ gas therein may be maintained at substantially 100%. The mixture of $CO_2$ gas and air supplied from the carbonator 12 to the cooling tank 10 is utilized in precarbonating and deaerating the water being supplied to the cooler. As the raw water flows in a thin film over the cooling plates 18, of cooling tank 10, the $CO_2$ gas being supplied to cooling tank 10 will have an affinity for the raw water and will be absorbed thereby and, thus, release some of the entrained or dissolved air therein. As previously explained the remaining air, in the partially deaerated water is subsequently removed in the carbonator where the water is fully charged and ready for use in the filling operation.

The terminology used in this specification is for the purpose of description and not for limitation as the scope of the invention is defined in the claim.

We claim:

In a water deaerating and carbonating system, a water cooling tank having a reservoir therein for partially deaerated water and a space above the reservoir for a superposed gas, a carbonator having a reservoir therein for carbonated water and a space above the reservoir for a superposed gas at a pressure higher than the pressure of the superposed gas in the space above the reservoir in said cooling tank, a $CO_2$ gas supply line connected to said carbonator, a $CO_2$ gas and air conducting line extending from the space above the reservoir in said carbonator to the space above the reservoir in said cooling tank, a raw water supply line adapted to flow water into said cooling tank in contact with the superposed gas in the space above the reservoir of said cooling tank to partially deaerate the water, means operatively associated with the reservoir of said cooling tank and the raw water supply line for controlling the supply of raw water to said cooling tank, a water line extending from a reservoir of said cooling tank to said carbonator, a pump in said water line controlled by the level of water in said carbonator, said pump causing flow of partially deaerated water from said cooling tank to said carbonator, a source of power for said pump, a valve in said conducting line, means operatively connected to said source of power for operating said valve to open the same when said pump is operating and to permit the flow of $CO_2$ gas and air from the space above the carbonated water in said carbonator to the space above the reservoir in said cooling tank, a flow meter and restrictor valve unit in said conducting line set to permit flow of $CO_2$ gas and air from said carbonator to said cooling tank at a predetermined rate of flow whereby water flowing into said cooling tank to replace partially deaerated water drawn therefrom absorbs approximately one volume of $CO_2$ gas from the $CO_2$ gas and air mixture flowing into the cooling tank, and a pressure regulator in said conducting line and positioned between said carbonator and said flow meter and restrictor valve unit, said pressure regulator delivering a constant pressure of $CO_2$ gas and air to said flow meter and restrictor valve unit when $CO_2$ gas and air are flowing in said conducting line.

References Cited in the file of this patent

UNITED STATES PATENTS

| | | |
|---|---|---|
| 1,972,994 | Huntley et al. | Sept. 11, 1934 |
| 2,212,598 | Hagist | Aug. 27, 1940 |
| 2,252,313 | Bostock | Aug. 12, 1941 |
| 2,628,825 | Kantor et al. | Feb. 17, 1953 |
| 2,631,829 | Carraway | Mar. 17, 1953 |